United States Patent [19]

Boylston et al.

[11] Patent Number: 5,042,241
[45] Date of Patent: Aug. 27, 1991

[54] GRASS CATCHER ASSEMBLY AND METHOD

[75] Inventors: Clifford Boylston, Conyers, Ga.; David Wark, Germantown, Tenn.

[73] Assignee: Fuqua Industries, (Snapper Division), McDonough, Ga.

[21] Appl. No.: 473,468

[22] Filed: Feb. 1, 1990

Related U.S. Application Data

[63] Continuation-in-part of Ser. No. 401,924, Sep. 1, 1989, Pat. No. 4,989,400.

[51] Int. Cl.$^5$ ............................................. A01D 34/70
[52] U.S. Cl. ...................................... 56/202; 56/16.6; 56/320.2
[58] Field of Search ................ 56/13.4, 16.6, 202–206, 56/320.2; 15/340.1

[56] References Cited

U.S. PATENT DOCUMENTS

| | | | |
|---|---|---|---|
| 3,874,152 | 4/1975 | Dahl | 56/202 |
| 3,890,772 | 6/1975 | Seifert et al. | 56/202 |
| 3,916,608 | 11/1975 | Garrison | 56/202 |
| 4,233,806 | 11/1980 | Richardson | 56/202 |
| 4,345,418 | 8/1982 | Arizpe | 56/202 |
| 4,377,063 | 3/1983 | Leaphart | 56/206 |
| 4,413,467 | 11/1983 | Arizpe | 56/202 |
| 4,566,257 | 1/1986 | Akrabawi | 56/202 |
| 4,747,259 | 5/1988 | Kline et al. | 56/202 |
| 4,848,070 | 7/1989 | Berglund | 56/16.6 |

Primary Examiner—Bruce M. Kisliuk
Attorney, Agent, or Firm—William E. Mouzavires

[57] ABSTRACT

Method and apparatus for mounting a disposable grass collecting bag to the discharge chute of a walk-behind mower. The bag is received in a grass collector having one end mounted to the mower handlebars and another end mounted to the discharge chute over the disposable bag. The collector mounting to the chute also secures the bag on the chute. During installation, after the bag is mounted about the chute, the body of the bag is folded and placed into the chute. The collector is then mounted to the mower with its inlet about the chute. When the lawn mower is started, the air flow through the chute will expel the bag into the collector and then inflate the bag in the collector to be ready to receive grass clippings.

7 Claims, 4 Drawing Sheets

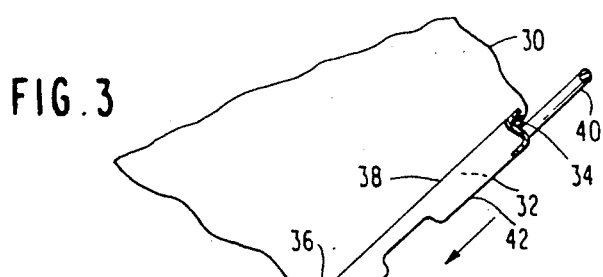
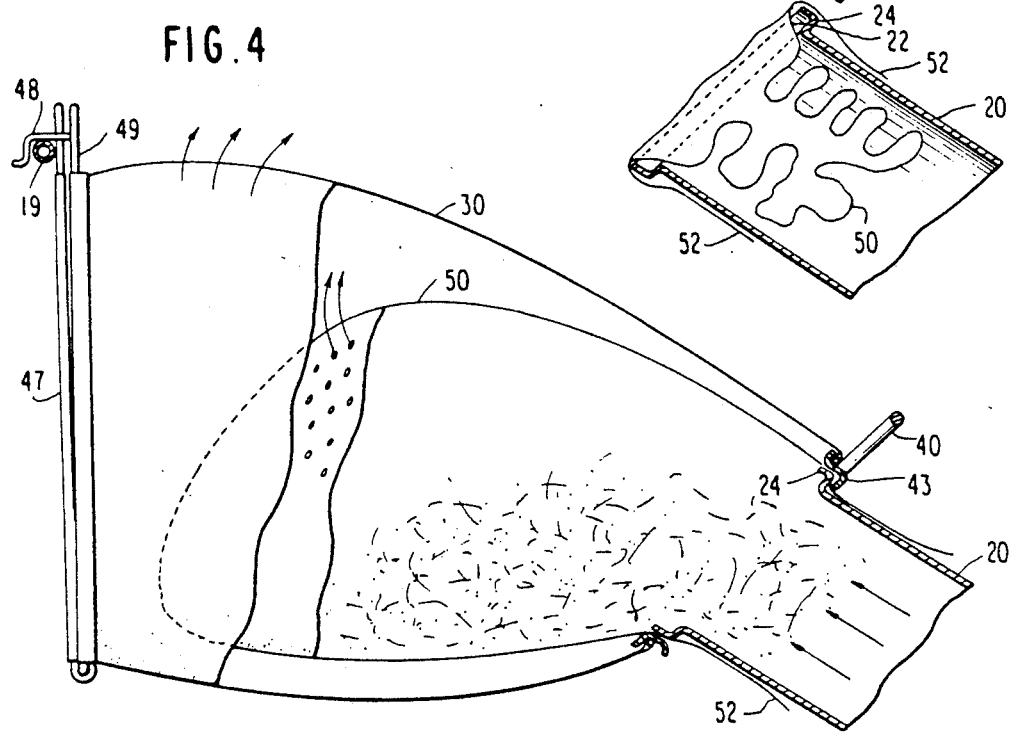
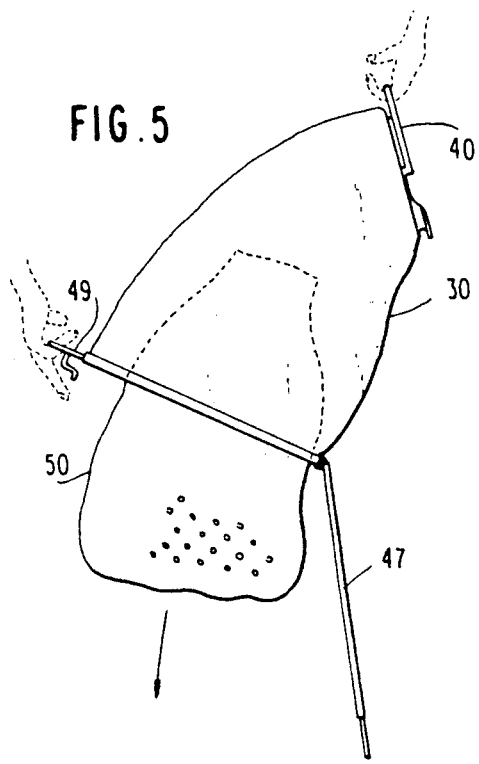
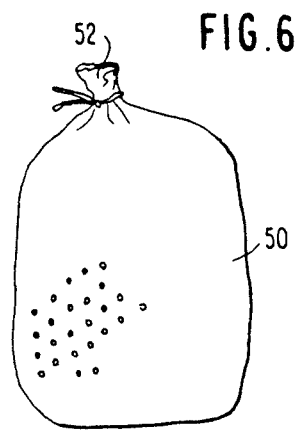

GRASS CATCHER ASSEMBLY AND METHOD

RELATED APPLICATION

The present application is a continuation in part of United States application Ser. No. 07/401924 filed Sep. 1, 1989 and U.S. Pat. No. 4,989,400 and entitled Disposable Bag and Mounting Apparatus for a Lawn Mower.

BACKGROUND OF INVENTION

The prior art is full of various methods and apparatus for collecting grass clippings cut from a walk-behind lawn mower. More recently the art has developed to the use of disposable plastic trash-type bags mounted in various ways behind the mower to directly receive the grass clippings so as to eliminate the step of transferring the clippings from a conventional grass collecting bag to a disposable trash bag as was done previously in the prior art. In one type of system such as shown in U.S. Pat. No. 4,377,063 to Leaphart a disposable perforated plastic trash-type bag 72 is attached about the outlet chute of the mower by an elastic band. The bag is supported from below by a base pan 28 mounted on the rear of the mower, and a shield 42 is hinged at the rear of the base while being hooked over the crossbars of the handle of the mower. A hood 56 extends over the top of the bag 72. Another disposable grass-collecting bag is shown in U.S. Pat. No. 3,971,198 to Lane in which the disposable bag 38 has its upper open end in a horizontal plane and folded about a support 46 below the mower chute. In another system disclosed in U.S. Pat. No. 4,345,418 Arizpe and U.S. Pat. No. 4,505,095 the disposable bag has its open end mounted in a vertical plane about a mounting member fixed about the discharge conduit of the mower. Other disposable-type grass collecting bag systems are disclosed in U.S. Pat. No. 4,095,398—Aurmann et al, U.S. Pat. No. 4,488,395—Wach, U.S. Pat. Nos. 4,791,779, 4,233,806—Richardson, U.S. Pat. No. 3,492,800—Petterson et al, U.S. Pat. No. 3,952,484—Van Swearingen, U.S. Pat. No. 3,961,467—Carpenter, U.S. Pat. No. 4,186,546—Mochado et al, U.S. Pat. No. 4,522,019—Edwards et al, U.S. Pat. No. 3,890,772—Seefert et al, U.S. Pat. No. 4,251,982—Skaja et al, and U.S. Pat. No. 4,030,273— Leader.

OBJECTS OF THE PRESENT INVENTION

One of the objects of the present invention is to provide novel and improved method and apparatus for mounting and positioning a grass-collecting bag on a lawn mower such as a walk-behind lawn mower. Included herein are such method and apparatus which will secure the bag relative to the discharge conduit of the lawn mower in a simple but effective manner.

Another object of the present invention is to provide a novel and improved method of quickly and easily mounting and/or removing a disposable grass-collecting bag relative to a lawn mower.

A further object of the present invention is to provide a novel method and apparatus of utilizing a disposable grass-collecting bag with a conventional or existing lawn mower and grass collector without requiring modification of the lawn mower or grass collector.

SUMMARY OF INVENTION

In summary of a preferred embodiment, a disposable, flexible grass collecting bag has an inlet mounted about the outlet of a discharge chute of a blade housing of a lawn mower. A receptacle, preferably a conventional grass collector, has an inlet which is mounted over the outlet of the discharge chute with the disposable bag secured between the collector and the chute. Means is provided on the outlet of the collector for securing the collector and in turn the disposable bag on the chute. In the preferred embodiment, the disposable bag has an inlet of reduced dimension to snugly fit about the outlet of the discharge chute. In order to install the disposable bag, the inlet of the disposable bag is mounted about the outlet of the chute and then the remainder of the disposable bag is folded and inserted into the chute. The collector is then mounted and secured to the discharge chute over the disposable bag which securement also secures the disposable bag to the chute. When the lawn mower is started, the flow of air through the discharge chute will expel the folded disposable bag from the chute and into the interior of the collector where the disposable bag will be inflated and ready to receive grass clippings as they follow from the discharge chute and into the disposable bag. When the disposable bag is full of grass clippings, the collector is removed from the mower and the disposable bag is removed from the collector.

DRAWINGS

Other objects and advantages of the present invention will become apparent from the following more detailed description taken in conjunction with the attached drawings in which:

FIG. 3 is a fragmental side view shown in cross-section illustrating how a disposable bag is initially mounted in the discharge chute of the lawn mower and how the collector is mounted relative to the discharge chute;

FIG. 4 is a side elevational view with parts in cross-section of the grass collecting system shown with the internal disposable bag inflated and receiving grass clippings;

FIG. 5 is an elevational view illustrating how the disposable bag is removed from the external collector after the disposable bag has been filled with grass clippings;

FIG. 6 is an elevational view of the disposable bag tied at its inlet and as it would be deposited for refuse collection;

DETAILED DESCRIPTION

Figure 1:
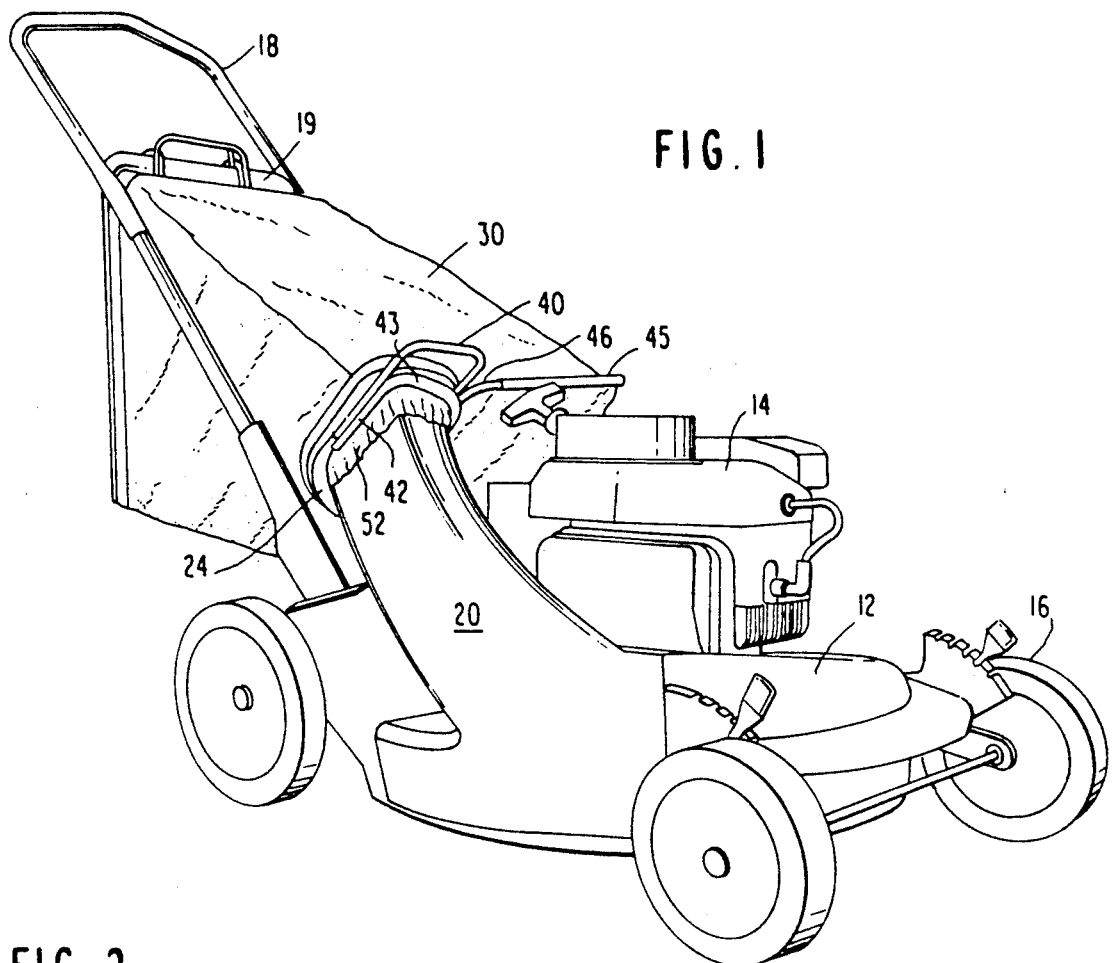
FIG. 1 is a perspective view of a walk-behind lawn mower incorporating a grass collecting system in accordance with the present invention.

Referring now to the drawings in detail, there is shown in FIG. 1 for illustrative purposes only a walk-behind lawn mower such as, for example, a SNAPPER brand mower including a rotary cutting blade (not shown) mounted for rotation in a horizontal plane in a blade housing 12 under the drive of an engine 14 mounted centrally on the housing 12. Wheels 16 support the blade housing 12 for movement over the ground surface under the control of the operator who holds the handlebars 18 in well-known manner. The cutting blade is typically provided with upstanding vanes for creating a vacuum in the blade housing 12 for raising the grass and grass clippings for cutting and conveyance of grass clippings to and through a discharge duct shown as a chute 20 which communicates with discharge opening in the blade housing 12. Chute 20 in the specific embodiment shown extends from one side of the blade housing upwardly and rearwardly where it terminates in an outlet 22 (see FIG. 3) surrounded by a flange 24. A more detailed description of the blade housing and discharge chute may be obtained from U.S. Pat. No. No. 3,568,421 Smith et al assigned to the Assignee of the present application. The disclosure of said U.S. Pat. No. 3,568,421 is hereby incorporated by reference into the present application as part hereof.

Grass clippings discharged from chute 20 may be received in the grass collector generally designated 30 which preferably is a flexible bag made of cloth and/or nylon material or any other suitable flexible material having one end formed with an inlet opening 32 (FIG. 3) adapted to be mounted to and in alignment with the outlet of chute 20. Collector 30 may be held on the chute in any suitable manner such as an elastic band hemmed into the collector 30 about its inlet 32, or an external band or drawstring or clamp not shown. However, in the present embodiment shown, the inlet of the collector 30 is provided with an elastic band 34 received in a hem thereof and the inlet is received about a flange 36 of a rigid frame 38 with the elastic band holding the inlet part of the collector 30 on the flange 36 as best shown in FIGS. 3 and 4. An inverted U-shaped rigid mounting member 40 is fixed to the frame 38 and has an inverted U-shape yoke including a pair of opposed channels 42 interconnected by a cross-channel 43 dimensioned to be received on the opposite sides and along the top of the flange 24 of the discharge chute to hold and position the collector 30 on the chute with the inlet and frame of the collector 30 aligned with the outlet of the discharge chute. Mounting member 40, 42 and the inlet portion of the bag are well-known in the prior art and used in the door type catcher sold with SNAPPER brand mowers. Therefore it should be understood that the collector 30 and its mounting method per se are in the prior art. In the specific embodiment shown, the rear of the collector 30 is formed with an opening defined by a frame 49 (see FIGS. 4 and 5) which opening is closed by a rectangular closure 47. When collector 30 is mounted on the handlebar 19 as shown in FIGS. 1 and 4, a keeper 48 fixed to the frame 49 is received about the handlebar 19 to hold the closure 47 in closed position while also mounting the rear of the collector 30 on the handlebar. The front of the collector bag 30 in the specific embodiment shown is provided with a sleeve 45 (see FIG. 1) received about an elongated frame rod 46 which is secured such as by welding or otherwise to the frame 40 as best shown in FIG. 1.

Figure 2:
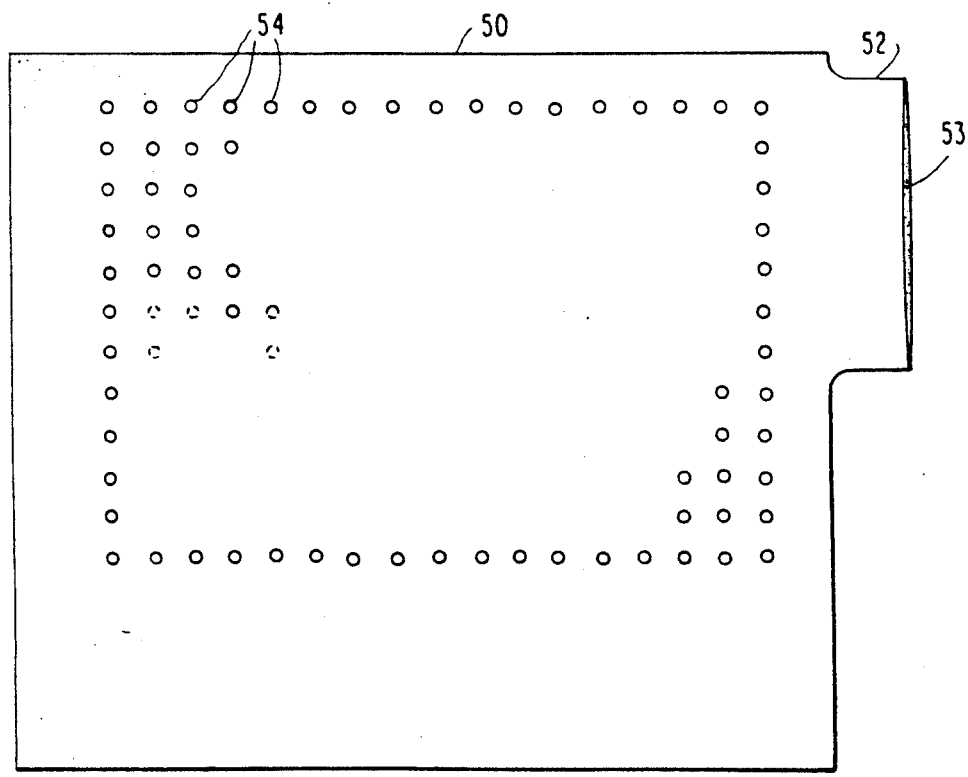
FIG. 2 is a side elevational view (enlarged in relation to the scale of FIG. 1) of a disposable grass collecting bag which is utilized in the system of the present invention.

In accordance with the present invention, a disposable grass-collecting bag is provided within the collector 30, and the collector 30 is utilized to hold the mouth or inlet of the disposable bag on the blade housing or discharge chute with the inlet of the disposable bag in alignment with the outlet of the discharge chute. In the preferred embodiment, the disposable bag 50 of FIG. 2 is employed since it has a cuff, neck or collar 52 of reduced dimension projecting from the front end of the bag as shown in FIG. 2 for a relatively snug receipt about the flange 24 of the discharge chute 20. Bag 5 is further provided with breathable fabric or apertures 54 in the opposite sides thereof to allow the escape of air during operation. Bag 50 may be made like typical plastic trash-type bags from overlying sheets of plastic such as polyethylene film, poly spun fabric such as poly spun polyethylene, or from any other suitable material including any recyclable or biodegradable material. Except for the opening 53 in the neck 52, the edges of the plastic breathable sheets forming the bag are sealed closed as shown in FIG. 2, and the specific bag 50 has a generally rectangular shape except of course for the cuff portion 52. In the present instance, bag 50 is dimensioned to be received in the collector 30 as shown in FIG. 4. It should be understood that the bag 50 per se in FIG. 2 is the subject of U.S. patent application Ser. No. 07/401924 filed 9/1/89 owned by the Assignee of the present application.

In the preferred embodiment shown, neck 52 of bag 50 is held on the discharge chute by the mounting member 40, 42 which engages the neck 52 and holds it against the flange 24 of the discharge chute. In cases where the external collector or bag is held on the chute 20 by a clamp or elastic band or drawstring, such securement will also serve to hold the neck 52 on the bag 50 about the discharge chute 20 through the engagement of the neck 52 by the inlet portion of the collector 30. For example the collector bag disclosed in Smith et al Pat. No. 3,568,421 identified above utilizes an elastic band in the collector bag about the inlet to hold the bag on the discharge chute, and this band securement would also be used to hold the disposable bag 50 on the chute.

In accordance with another aspect of the present invention, the bag 50 is installed by first mounting its inlet about the discharge chute 20 and then folding the remaining body portion of the bag and inserting the folded body into the discharge chute 20 as shown in FIG. 3. The external collector 30 or other receptacle or bag 30 is then mounted to the mower handlebar 19 and with its inlet secured about the discharge chute in the manner described above thereby also securing inlet of the bag 50 about the chute as described above. When the lawn mower is started, the flow of air will force the folded body of the bag 50 into the collector 30 and inflate the bag for receipt of grass clippings as illustrated in FIG. 4. When the bag is full of clippings, the outer collector 30 in the specific embodiment shown is removed from the mower and held by the mounting member 40 to position the collector vertically so that the bag 50 will fall through gravity through the rear end opening of the collector as the closure 47 opens as shown in FIG. 5. With other types of collectors 30 or other receptacles, the disposable bag 50 may be removed in any other suitable way depending upon the design of the outer collector.

Figure 7:
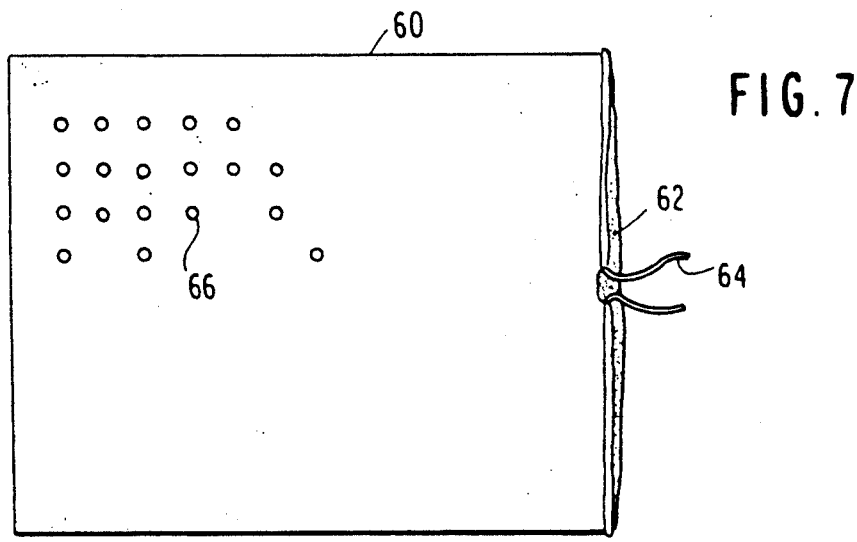
FIG. 7 is a side elevational view of another type of disposable bag having a generally rectangular shape and including a draw string about its inlet opening.

Although in the preferred embodiment described above the disposable bag 50 with neck 52 is employed, it should be understood that other bag shapes, sizes and designs may also be employed instead. For example, a conventional trash collecting bag generally designated 60 in FIG. 7 may be employed having a generally rectangular outline when flat. One end of the bag is open as shown by the numeral 62 along its entire end dimension and the bag is provided with a drawstring 64 which of course is conventional. The sidewalls of the bag 60 are provided with apertures 66 or are made of porous fabric to allow air to escape from the bag during use. To install the bag 60 of FIG. 7, the inlet 62 is placed about the outlet of the chute 20 and the drawstring 64 is drawn to reduce the dimension of the inlet 62 until it tightly engages around the discharge chute 20. The remainder of the mounting is the same, that is to say the body of the bag 60 is folded and inserted into the chute such that when the lawn mower is started the body of the bag will be expelled by the flow of air into the outer collector 30 and inflated to receive grass clippings.

Figure 8:
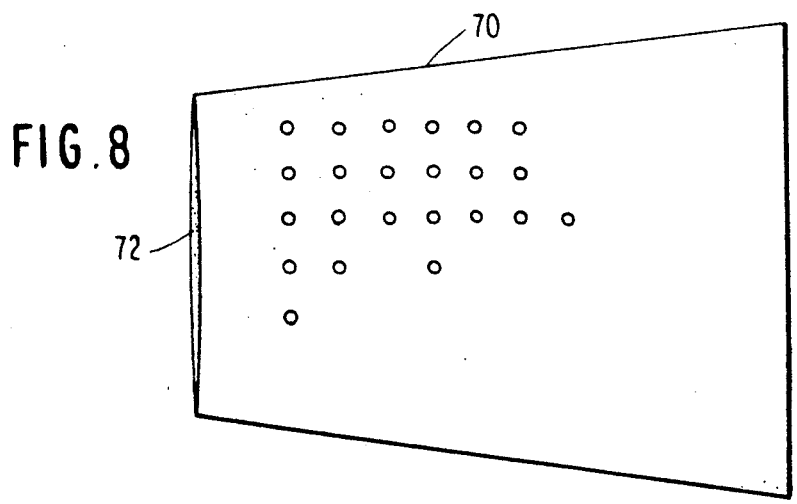
FIG. 8 is an elevational view of another disposable bag that may be utilized in accordance with the present invention, the bag having a generally frusto conical outline.

FIG. 8 discloses another type of disposable bag 70 having a generally frusto conical outline when folded flat and including an inlet 72 of reduced dimension. The inlet of bag 70 may be secured on the discharge chute 20 of the lawn mower by any suitable means including a band or drawstring or even in some cases the inlet 72 may be secured by relying solely on the securement of the collector or outer bag 30.

Figure 9:
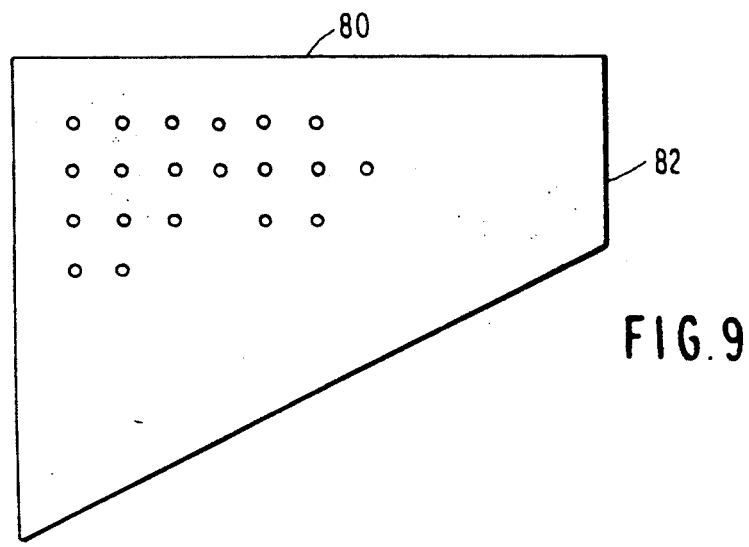
FIG. 9 is a side elevational view of yet another type of disposable bag that may be employed, the bag having a generally trapezoidal outline.

FIG. 9 discloses another type of disposable bag 80 having a generally trapezoidal outline when folded flat and including an inlet 82 of reduced dimension to snugly fit on the chute 20 of the lawn mower. The inlet 82 would have the same general size as the neck 52 in the bag 50 described above.

Figure 10:
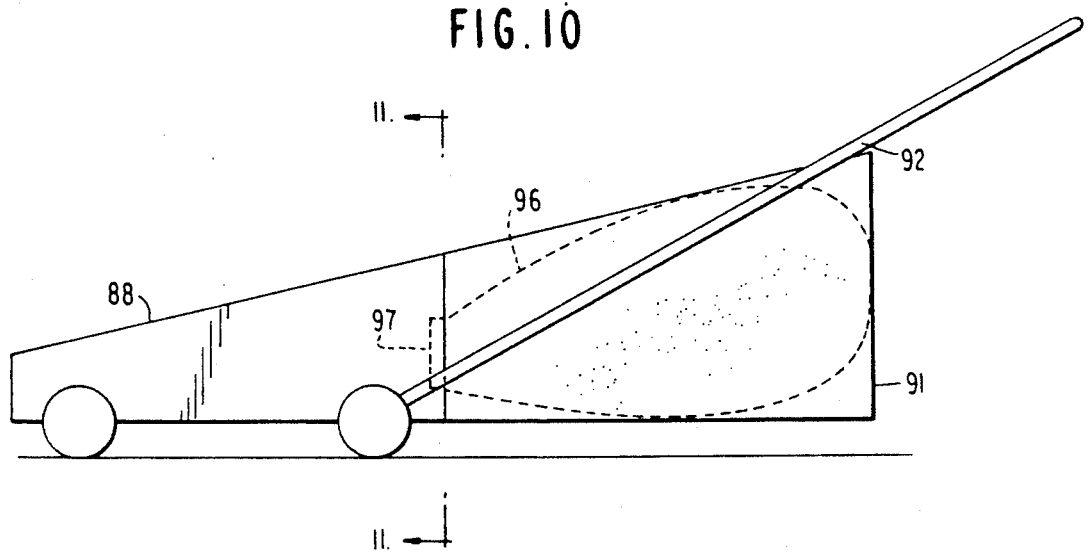
FIG. 10 is a side elevational view of another walk-behind lawn mower embodying another grass collection system in accordance with the present invention.
Figure 11:
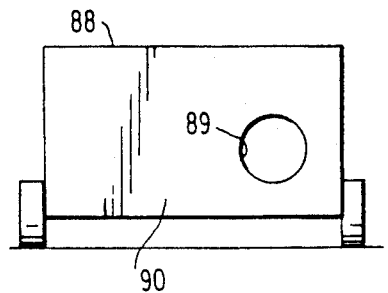
FIG. 11 is an end elevational view taken generally along lines 11—11 of FIG. 10.
Figure 12:
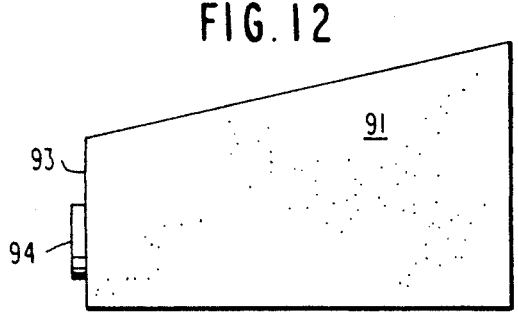
FIG. 12 is a side elevational view of an external grass collector incorporated in the system of FIG. 10.
Figure 13:
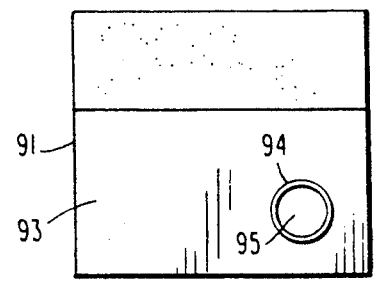
FIG. 13 is an end elevational view of the collector shown in FIG. 12.

Referring now to FIGS. 10 to 13, there is shown another type of lawn mower having a blade housing 88 incorporating a rear discharge passage terminating in a discharge port 89 in a generally vertical wall 90 as shown in FIG. 11. A grass collector or receptacle 91 is suspended at its rear end from the handlebar 92 and has a generally vertical front wall 93 received against the rear wall 90 of the blade housing. In the preferred embodiment the collector 91 is made from a rigid or self-supporting material or at least the front wall 93 thereof is formed of such material. A collar or flange 94 shown as circular is formed or fixed to the front wall 93 about an inlet port 95 in front wall 93 as shown in FIG. 13. Collar 94 is received in the outlet port 89 of the blade housing as best shown in FIG. 10 when the collector is mounted on the blade housing. A disposable, flexible bag 96 is inserted in the collector 91 but with a neck or inlet portion 97 thereof extending outwardly through the inlet port 95 of the collector. Neck portion 97 of the disposable bag 96 is folded backwardly about collar 94 of the collector 91 and against the vertical wall 93 of the collector such that when the collector 91 is mounted to the blade housing 88, neck 97 will be held in position between the collector 91 and the blade housing 88. In use, when the engine is started, the flow of air through the outlet port 89 will inflate the disposable bag 96 and then carry grass clippings into the disposable bag 96. Collector 91 may be provided with any suitable opening or door (not shown) for removing the disposable bag once it is filled with grass clippings.

What is claimed is:

1. A method of mounting a disposable flexible bag to a lawn mower including means having a discharge port and a reusable grass-collector having an inlet in communication with said port, the method including the steps of mounting the open end of the disposable bag to said means and in communication with said port and then mounting the inlet end of the collector to said means with the disposable bag secured between the collector and said means and wherein after the disposable bag is mounted to said means the disposable bag is inserted into the mouth of the port such that upon operation of the mower the disposable bag will be forced into the collector and inflated therein.

2. The method defined in claim 1 wherein the collector has a mounting member attached about the inlet of the collector and in mounting the collector to said means the mounting member engages and holds the disposable bag against said means.

3. The method defined in claim 2 wherein after the disposable bag is mounted to said means the disposable bag is inserted into the mouth of the port such that upon operation of the mower the disposable bag will be forced into the collector and inflated therein.

4. The method defined in claim 1 wherein the disposable bag is removed from the collector after use by removing the collector from said means with the disposable bag in the collector holding the open end of the collector above an opposite rear end of the reusable bag, opening the rear end of the collector and allowing the disposable bag to be deposited by gravity through the opened rear end of the collector.

5. The method defined in claim 1 wherein the disposable bag is removed from the collector after use by removing the collector from said means and then removing the disposable bag from the collector.

6. A method of mounting a flexible bag to a lawn-mower including means having a discharge port and a reusable grass collector having an inlet in communication with said port, the method including the steps of mounting the disposable bag to the mower with the open end of the disposable bag in communication with said port and inserting the bag into said port such that upon operation of the mower the disposable bag will be forced into the collector and inflated therein.

7. The method defined in claim 6 wherein the bag has a reduced neck portion mounted about said discharge port and wherein the inlet of the collector is mounted about the neck of the bag and serves to secure the neck of the bag relative to the discharge port.

* * * * *